United States Patent
Ramaiyer (10) Patent No.: US 11,422,881 B2
(45) Date of Patent: Aug. 23, 2022

(54) SYSTEM AND METHOD FOR AUTOMATIC ROOT CAUSE ANALYSIS AND AUTOMATIC GENERATION OF KEY METRICS IN A MULTIDIMENSIONAL DATABASE ENVIRONMENT

(71) Applicant: ORACLE INTERNATIONAL CORPORATION, Redwood Shores, CA (US)

(72) Inventor: Kumar Ramaiyer, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 16/370,295

(22) Filed: Mar. 29, 2019

(65) Prior Publication Data

US 2020/0026592 A1    Jan. 23, 2020

Related U.S. Application Data

(60) Provisional application No. 62/700,761, filed on Jul. 19, 2018.

(51) Int. Cl.
  *G06F 11/07* (2006.01)
  *G06F 16/22* (2019.01)
  *G06F 11/34* (2006.01)

(52) U.S. Cl.
  CPC ........ *G06F 11/079* (2013.01); *G06F 11/3409* (2013.01); *G06F 11/3438* (2013.01); *G06F 16/2264* (2019.01)

(58) Field of Classification Search
  CPC ............... G06F 11/079; G06F 11/3409; G06F 16/2264; G06F 11/3438; G06F 16/282; G06Q 10/06; G06Q 10/10
  See application file for complete search history.

(56) References Cited

U.S. PATENT DOCUMENTS 5,574,952 A  11/1996 Brady
5,915,129 A   6/1999 Slivka
(Continued)

OTHER PUBLICATIONS

Driscoll, James R. et al., "Making Data Structures Persistent", Journal of Computer and System Sciences, vol. 38, No. 1, Feb. 1989, Printed in Belgium, Copyright © 1989, 39 pages.
(Continued)

*Primary Examiner* — Bryce P Bonzo
*Assistant Examiner* — Michael Xu
(74) *Attorney, Agent, or Firm* — Tucker Ellis LLP (57) ABSTRACT

In accordance with an embodiment, described herein are systems and methods for automatic root cause analysis and generation of key metrics in a multidimensional database. A system can comprise a computer and a multidimensional database server executing on the computer, wherein the multidimensional database server supports at least one hierarchical structure of data dimensions. One or more one or more user logs are created, the one or must user logs representing a plurality of operations performed by a plurality of users of the multidimensional database server and accessing the at least one hierarchical structure of data dimensions. Based upon historical data of the at least one hierarchical structure of data dimensions, a change in a query result of a user is detected. Based upon the detection of a change, a set of data dimensions can be provided to the user that contains the data dimensions most contributing to the change.

20 Claims, 5 Drawing Sheets

(56) References Cited

U.S. PATENT DOCUMENTS

| | | | |
|---|---|---|---|
| 6,094,651 A * | 7/2000 | Agrawal | G06F 16/283 |
| 6,161,105 A | 12/2000 | Keighan | |
| 6,574,720 B1 | 6/2003 | Hopeman | |
| 6,629,102 B1 | 9/2003 | Malloy | |
| 6,766,325 B1 | 7/2004 | Pasumansky | |
| 6,873,994 B2 | 3/2005 | Kootale | |
| 7,133,876 B2 | 11/2006 | Roussopoulos | |
| 7,392,242 B1 | 6/2008 | Baccash | |
| 8,156,083 B2 | 4/2012 | Banerjee | |
| 8,386,296 B2 | 2/2013 | Hage | |
| 10,083,195 B2 | 9/2018 | Zhou | |
| 10,318,498 B2 | 6/2019 | Tran | |
| 10,346,435 B2 | 7/2019 | Walker | |
| 10,360,527 B2 | 7/2019 | Abe | |
| 10,467,251 B2 | 11/2019 | Menon | |
| 2002/0029207 A1 | 3/2002 | Bakalash | |
| 2003/0005420 A1 | 1/2003 | Ghosh | |
| 2004/0054858 A1 | 3/2004 | Chandrasekaran | |
| 2005/0262108 A1 | 11/2005 | Gupta | |
| 2006/0010159 A1 | 1/2006 | Mirchandani | |
| 2006/0085742 A1 | 4/2006 | Harold | |
| 2006/0106769 A1 | 5/2006 | Gibbs | |
| 2006/0271568 A1 | 11/2006 | Balkir | |
| 2007/0027674 A1 | 2/2007 | Parson | |
| 2007/0061344 A1 | 3/2007 | Dickerman | |
| 2007/0088691 A1 | 4/2007 | Dickerman | |
| 2007/0094668 A1 | 4/2007 | Jacquot | |
| 2008/0288524 A1 | 11/2008 | Dumitru | |
| 2009/0030915 A1 * | 1/2009 | Winter | G06F 16/283 |
| 2009/0248651 A1 | 10/2009 | Perry | |
| 2009/0249125 A1 | 10/2009 | Bhatawdekar | |
| 2009/0276705 A1 | 11/2009 | Ozdemir | |
| 2011/0173192 A1 * | 7/2011 | Hu | G06F 16/9535 707/723 |
| 2012/0078896 A1 * | 3/2012 | Nixon | G05B 19/042 707/732 |
| 2014/0046920 A1 | 2/2014 | Shuma | |
| 2014/0122413 A1 | 5/2014 | Presti | |
| 2017/0116032 A1 | 4/2017 | Tran | |
| 2017/0116215 A1 | 4/2017 | Ramaiyer | |
| 2017/0116281 A1 | 4/2017 | Roytman | |
| 2017/0116290 A1 | 4/2017 | Reichman | |
| 2017/0116308 A1 | 4/2017 | Alberg | |
| 2017/0116309 A1 | 4/2017 | Menon | |
| 2017/0116310 A1 | 4/2017 | Walker | |
| 2017/0116311 A1 | 4/2017 | Reichman | |
| 2017/0116312 A1 | 4/2017 | Reichman | |
| 2017/0116313 A1 | 4/2017 | Roytman | |
| 2017/0169244 A1 * | 6/2017 | McGrew | G06F 16/2329 |
| 2017/0262495 A1 * | 9/2017 | Peloski | G06F 30/20 |
| 2019/0073366 A1 | 3/2019 | Raimaiyer | |
| 2019/0079959 A1 | 3/2019 | Raimaiyer | |
| 2019/0102445 A1 | 4/2019 | Raimaiyer | |
| 2019/0102446 A1 | 4/2019 | Raimaiyer | |
| 2019/0102447 A1 | 4/2019 | Raimaiyer | |
| 2019/0258612 A1 | 8/2019 | Tran | |
| 2019/0286638 A1 | 9/2019 | Walker | |
| 2019/0362025 A1 * | 11/2019 | Zhou | G06Q 10/1053 |

OTHER PUBLICATIONS

Oracle, EPM Information Development Team, Oracle® Integrated Operational Planning, Fusion Edition Release 4.0.1 Installation Guide, Copyright © 2001, 2009, 18 pages.

Oracle, EPM Information Development Team, Oracle® Integrated Operational Planning, Fusion Edition Release 4.0.1 User's Guide, Copyright © 2004, 2009, 272 pages.

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_I4gCQ&q=%22dynamic+flow+process%22+definition&oq=%22dynamic•flow+process%22+definition&gs I=psy-ab .3 ... 38876 .39886 .. 40199 ... 0 .0 .. 0. 76.437 .8 ...... 0 .... 1 .. gws-.viz ....... 0i71 j0i7i30j0i30j0i8i30.

Dynamic Flow process OLAP Nov. 26, 2018, google.com, https://www.google.com/search?biw=1920&bih=1076&ei=njv8W_CJD4mizwK_I4gCQ&q=%22dynamic+flow+process%22+definition&oq=%22dynamic•flow+process%22+definition&gs I=psy-ab .3 ... 38876 .39886 .. 40199 ... 0 .0 .. 0. 76.437 .8 ...... 0 .... 1 .. gws-.viz ....... 0i71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright © 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

* cited by examiner

SYSTEM AND METHOD FOR AUTOMATIC ROOT CAUSE ANALYSIS AND AUTOMATIC GENERATION OF KEY METRICS IN A MULTIDIMENSIONAL DATABASE ENVIRONMENT

CLAIM OF PRIORITY

This application claims the benefit of priority to U.S. Provisional patent application entitled "SYSTEM AND METHOD FOR AUTOMATIC ROOT CAUSE ANALYSIS AND AUTOMATIC GENERATION OF KEY METRICS IN A MULTIDIMENSIONAL DATABASE ENVIRONMENT", Application No. 62/700,761, filed on Jul. 19, 2018, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to systems and methods for root cause analysis and automatic generation of key metrics in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein are systems and methods for automatic root cause analysis and generation of key metrics in a multidimensional database. A system can comprise a computer and a multidimensional database server executing on the computer, wherein the multidimensional database server supports at least one hierarchical structure of data dimensions. One or more one or more user logs are created, the one or must user logs representing a plurality of operations performed by a plurality of users of the multidimensional database server and accessing the at least one hierarchical structure of data dimensions. Based upon historical data of the at least one hierarchical structure of data dimensions, a change in a query result of a user is detected. Based upon the detection of a change, a set of data dimensions can be provided to the user that contains the data dimensions most contributing to the change.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
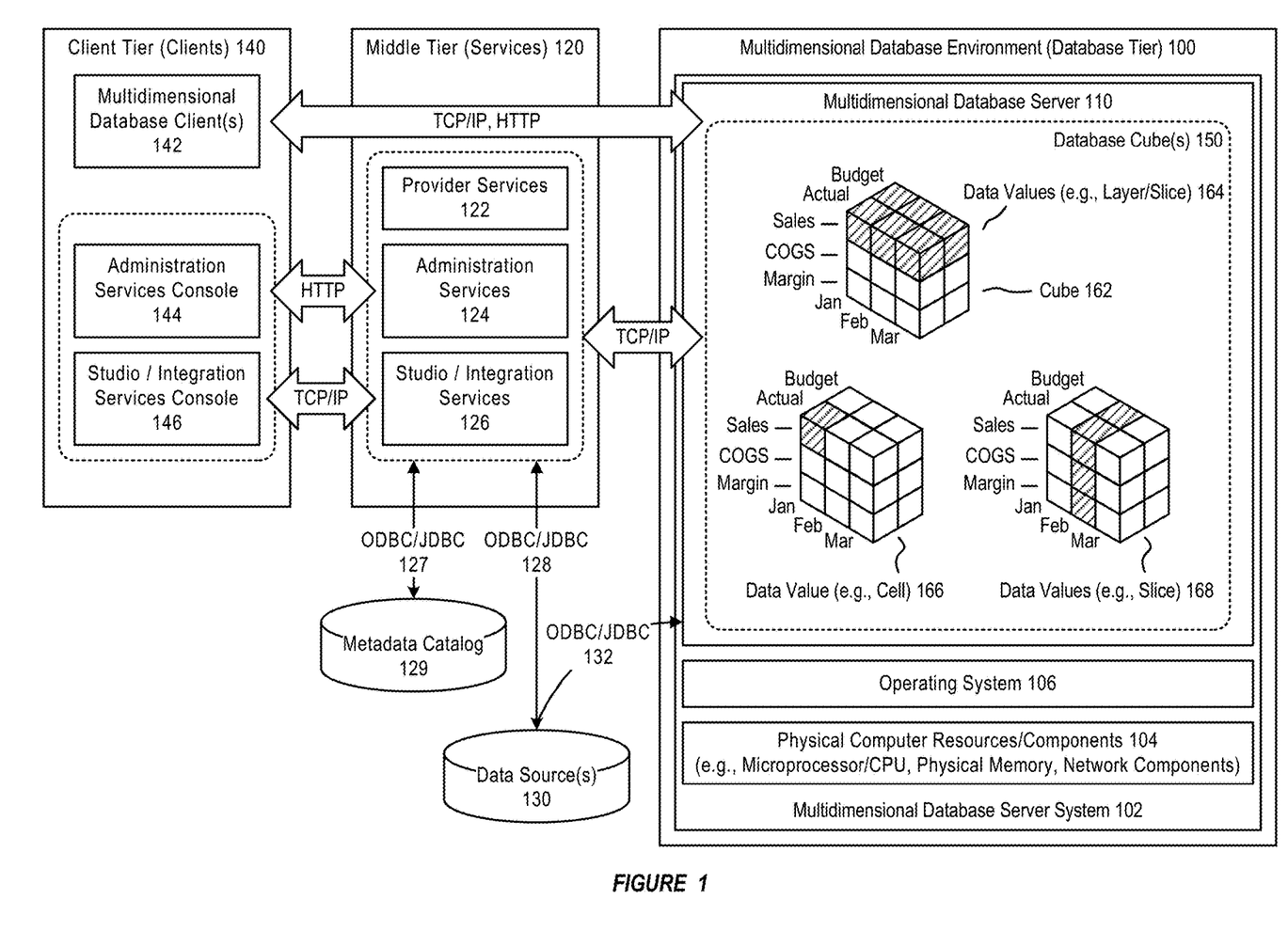
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Automatic Root Cause Analysis and Generation of Key Metrics

In accordance with an embodiment, described herein systems are for root cause analysis and automatic generation of key metrics in a multidimensional database environment In accordance with an embodiment, a multidimensional data base can contain tens of thousands, or even millions of data dimensions, of which only a few are of key interest to any given user at any given time.

Figure 2:
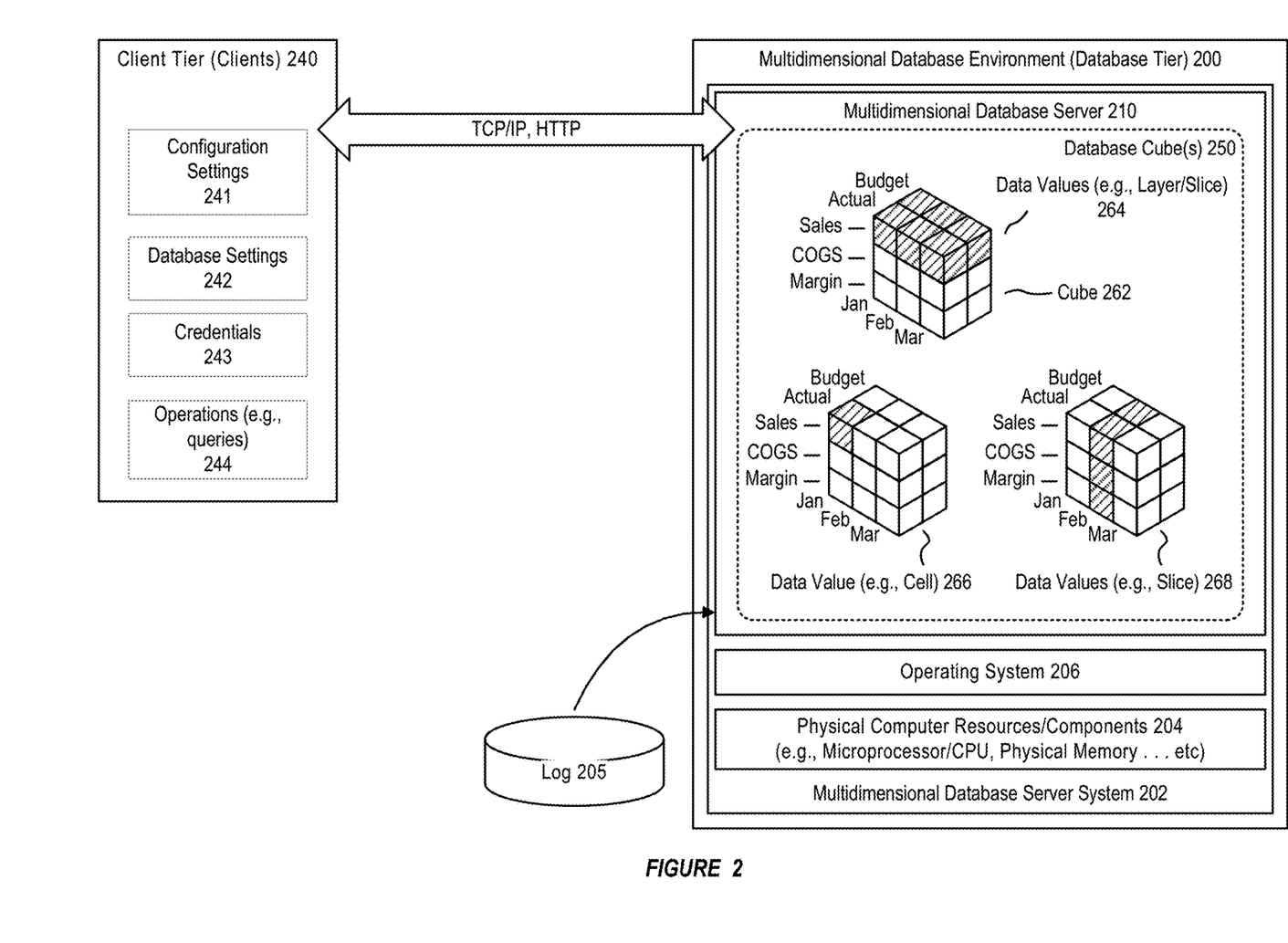
FIG. 2 shows a system for supporting root cause analysis and generation of key metrics, in accordance with an embodiment.

FIG. 2 shows a system for supporting root cause analysis and generation of key metrics, in accordance with an embodiment.

In accordance with an embodiment, each time a customer at a client tier 240, or a user associated with a customer, logs in to the system, or a system similar to that described above, an event log 205 is triggered that records each operation that the user performs. Such operations types include, but are not limited to, configuration settings 241, database settings 242, user logins 243, user operations 244 (e.g., queries).

As illustrated in FIG. 2, in accordance with an embodiment, a multidimensional database environment, operating as a database tier 200, can include one or more multidimensional database server system(s) 202 that can be accessed vie a communication from the client tier 240 (either directly or via a middle tier as shown in FIG. 1). Each system 202 can include physical computer resources or components 204 (e.g., microprocessor/CPU, physical memory, network components), an operating system 206, and one or more multidimensional database server(s) 210 (e.g., Essbase Servers). The multidimensional database server system 202 can be associated with and have access to a database that can be used to log 205 each client interaction with the database tier 200.

In accordance with an embodiment, the client tier 240 can include one or more multidimensional database client(s) (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console, or a studio/integration services console.

In accordance with an embodiment, communication between the client, middle (not shown), and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 250, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in Figure, which illustrates a cube 262 that might be used in a sales-oriented business application, when a query indicates "Sales", the system can interpret this query as a slice or layer of data values 264 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 268 for "February" examines all of those data values for which a time/year dimension is fixed for "February".

In accordance with an embodiment, metrics associated with each operation types 241, 242, 243, 244 (and others not shown) can additionally be logged at the accessible log 205. Such metrics associated with each operation type can include, for example, calculation execution in seconds, configuration settings, database settings, data load execution in seconds, dimension build execution in seconds, errors in operations, exception, export exception in seconds, login duration in seconds.

Figure 3:
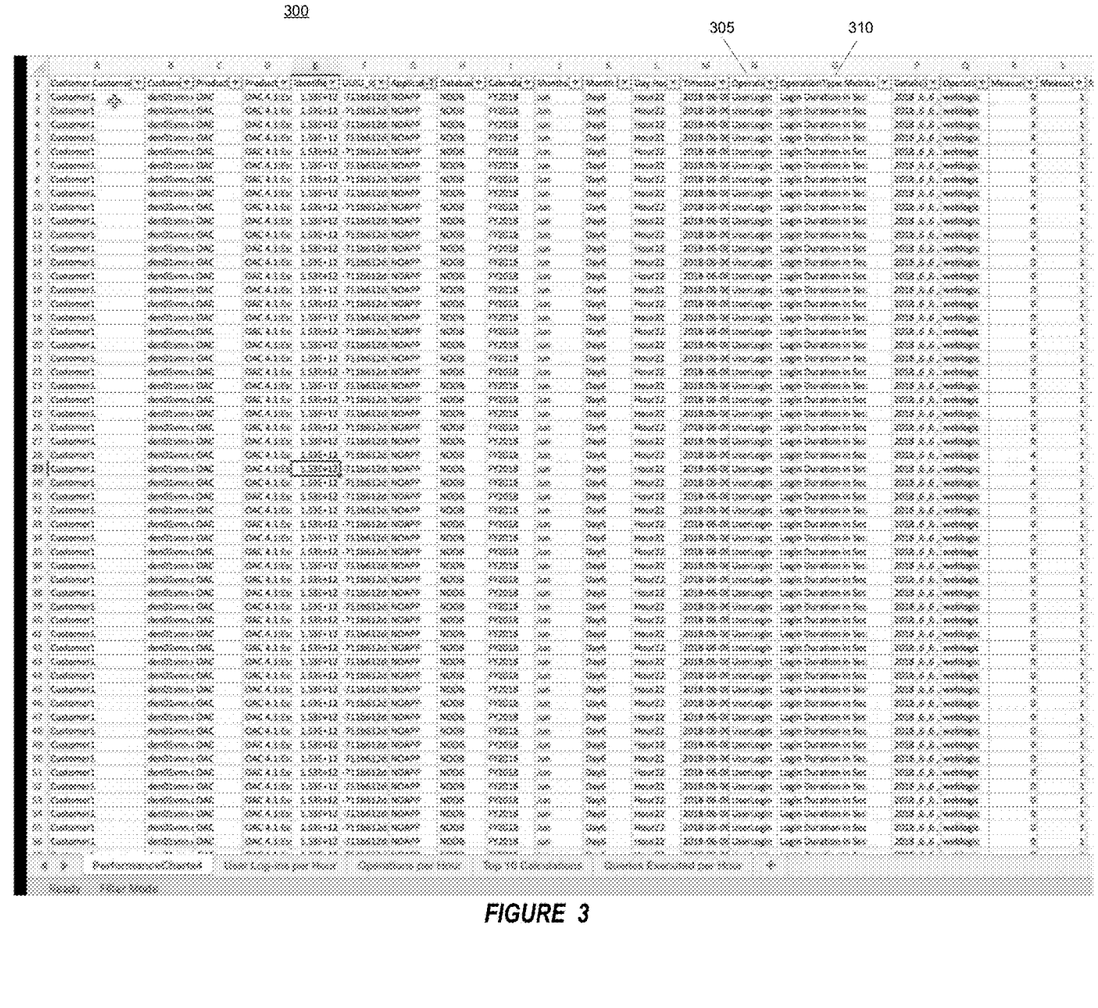
FIG. 3 shows an exemplary log file created for a multidimensional database environment, such as that described above.

FIG. 3 shows an exemplary log file created for a multidimensional database environment, such as that described above.

In accordance with an embodiment, the log file 300 can comprise a number of dimensions, including a dimension related to operation type 305 and operation type metrics 310.

In accordance with an embodiment, the system, in the log file, can track and set each operation and operation type to a user. In other words, a log file can be generated for each user of the multidimensional database system. Alternatively, a log file can be generated for each customer of the multidimensional database system, where each user associated for the customer can be associated with a dimension within the log file.

In accordance with an embodiment, after creation of a log file 300, the log file can be transformed into a multidimensional database cube, which can be referred to as a performance cube. The performance cube can be refreshed at intervals (e.g., daily, hourly) set by the customer, user, or an administrator of the multidimensional database system.

In accordance with an embodiment, from the performance cubes, various metrics can be generated, such as the number of operations performed by any given user per hour. As well, different users from a same customer can be compared to determine where certain users are most interested in querying data for example.

In accordance with an embodiment, for example, based upon an analysis and comparison with and between performance cubes, it can be determined that a first user regularly checked the produce revenue for a first product each morning at a certain time, and then again each evening at a certain time. It can also be determined that a second user checked the production cost for a first product each morning at a certain time and again each evening at a certain time. Such data and analysis can be fed into a big data mechanism to output, for example, targeted queries.

In accordance with an embodiment, targeted or personalized queries can be provided to users of the multidimensional database system based upon the analysis of the performance cubes (either by a straight analysis or by analysis from a big data mechanism).

In accordance with an embodiment, and referring back to the example above, a personalized query could then be provided to the first user in the morning and evening that provided a one-click (or more streamlined) access to the queried revenue for the first product. As well, a personalized query could be provided to the second user for the cost for the first product at the certain times in the morning and evening that the second user regularly made such a query.

In accordance with an embodiment, such personalized queries improve the performance of the system by allowing for faster and easier to access data summaries.

Figure 4:
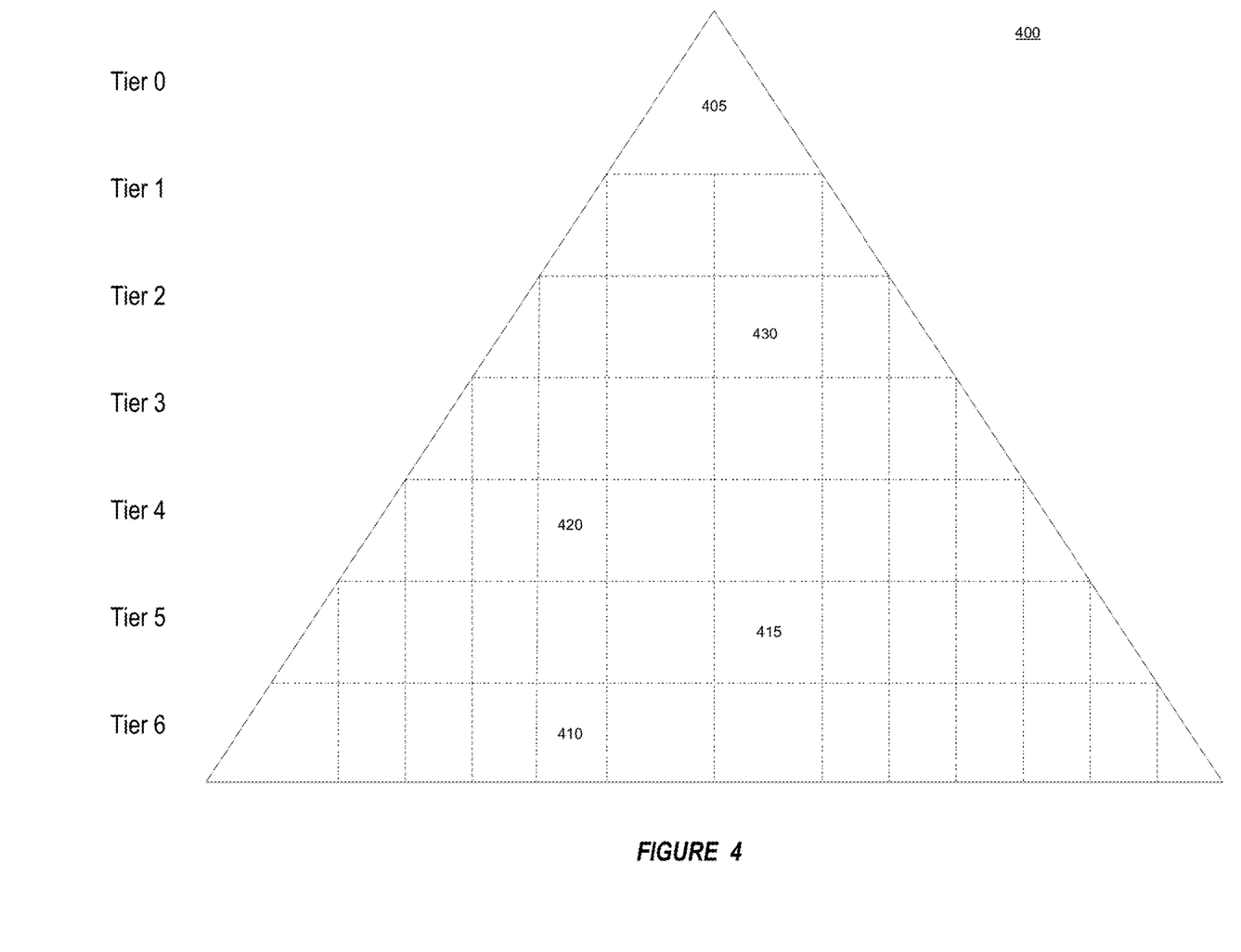
FIG. 4 shows an exemplary tiered data structure in a multidimensional database environment, in accordance with an embodiment.

FIG. 4 shows an exemplary tiered data structure in a multidimensional database environment, in accordance with an embodiment.

In accordance with an embodiment, a system and method for automatic root cause analysis can be provided. In accordance with an embodiment, a multidimensional tiered data structure 400 can be provided in a multidimensional database environment. Such a tiered data structure can be the result of a query, for example a personalized query as discussed above. The tiered data structure can comprise a number of tiers, such as tier 0 through tier 6, wherein each tier is associated with one or more data dimensions within the tiered data structure (represented in the Figure as the cells defined by the dashed lines within the tiered data structure).

In accordance with an embodiment, the target of such a query can be targeted to data dimension 405.

In accordance with an embodiment, dimension 405 can, through historical tracking of data, be within a range of values that can be expected as a result of a query targeting dimension 405.

In accordance with an embodiment, however, what is desired is to know the top contributing factors when the queried value of 405 changes.

In accordance with an embodiment, for example, a regular value for dimension 405 can be $1,000,000 (e.g., product revenue for one of the customer's products). However, when the user queries the value, the product revenue 405 is now reporting at $10,000,000—an entire factor of difference from an expected value.

In accordance with an embodiment, what is desired then is to determine what factors (e.g., which dimensions) contributed most to the change in value at dimension 405.

In accordance with an embodiment, while there appear to be a reasonable number of dimensions within tiered data structure 400 in the Figure, in actual practice, there can be hundreds of thousands of dimensions, or even millions of dimensions, that all contribute the queried value at dimension 405. Because of this, is undesirable to rely upon a user to sift through this multitude of dimensions to determine which change to the set of dimensions causes such a change at dimension 405.

In accordance with an embodiment, then, a customizable set of largest change factors (i.e., dimensions) can be automatically determined and provided to a user.

In accordance with an embodiment, a priority queue (or other similar mechanism) can be used by the system to determine which dimensions of the plurality of dimensions contained in 400 contributed most to the change in dimension 405. The priority queue can first determine which dimensions have changed between the queried values of 405, and then rank the changes in order based upon which changes to which data dimensions contributed most to the overall change in value at 405.

In accordance with an embodiment, the system can iterate through all changes in the dimensions of 400 and keep a priority queue having a set of top contributing factors.

In accordance with an embodiment, for example, the system can determine that a change in value of dimension 430 caused a change in $500 to the queried value at 405. This can be initially placed at the head of the priority queue. The system can then determine that a change in the value of dimension 420 caused a change of $500,000 to the queried value at 405. This can then be placed in front of the change in value at 430 in the priority queue. The system can then determine that a change in the value of dimension 415 caused a change of $50,000 to the queried value at 405. This value can then be placed in front of the change in value at 430, but behind the change in value at 420 in the priority queue. The system can then determine that a change in the value of dimension 410 caused a change of $8,000,000 to the queried value at 405. This change can be placed at the front of the priority queue. Finally, and based upon the set length of the priority queue as three (in this example), a change in value at dimension 415 can be determined to have caused a change in value at 05 of $449,500. Thus, the priority queue can drop the dimension change at 430 from the priority queue as it is less significant than the value changes at dimensions 430, 415, and 410.

In accordance with an embodiment, then, the system can automatically provide a root cause analysis to a user upon a query resulting in an unexpected result. This root cause analysis can be provided in the form of a priority queue that ranks changes in dimensions upon with the queried value depends.

In accordance with an embodiment, while discussed above in the context of an unexpected result, the root cause analysis system and method can additionally be provided whenever a change to a queried dimension changes. This can be provided by setting a threshold change level for the generation of a root cause analysis report to any change in value for the queried dimension.

Figure 5:
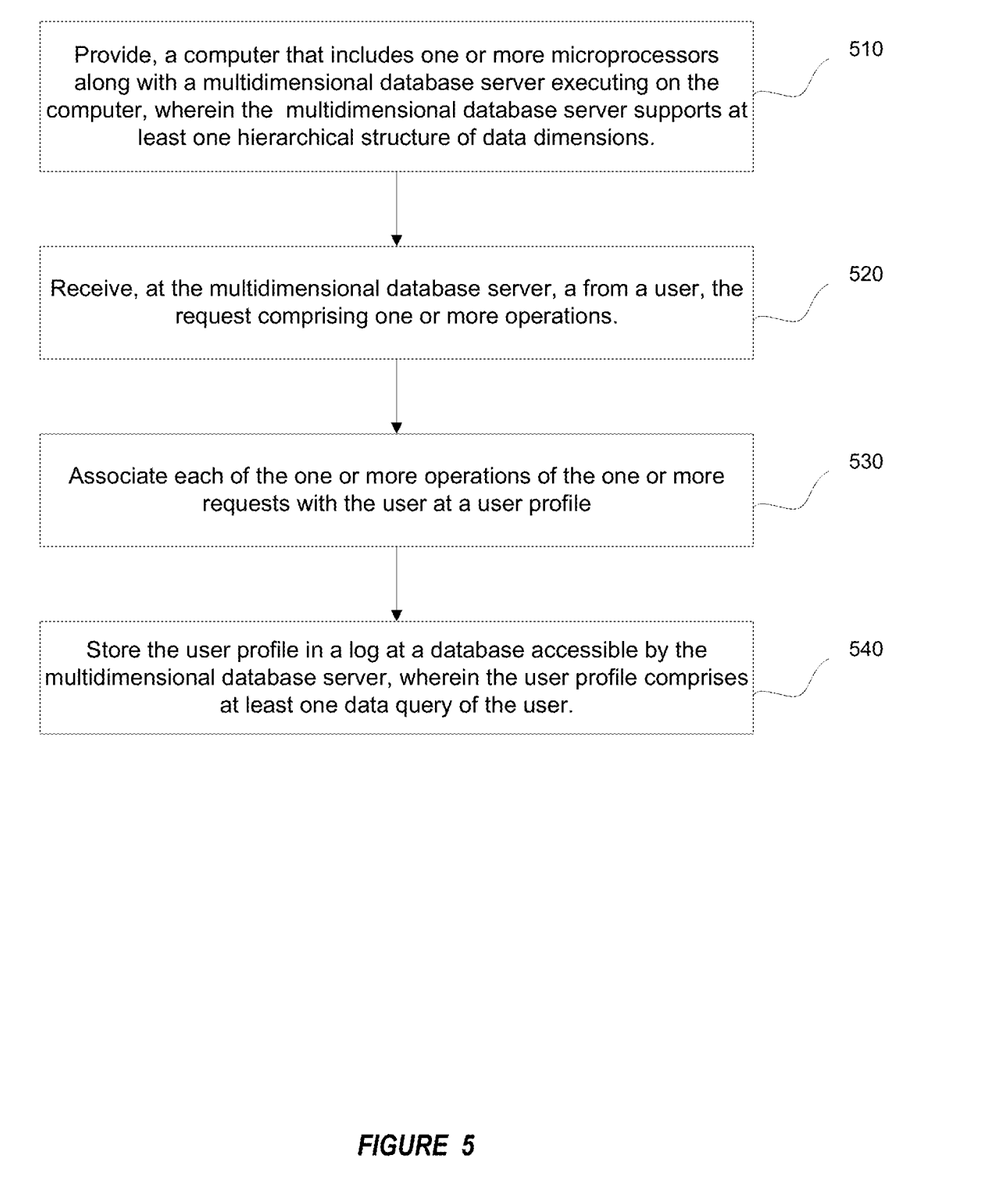
FIG. 5 is a flowchart of a method for automatic root cause analysis and generation of key metrics in a multidimensional database, in accordance with an embodiment.

FIG. 5 is a flowchart of a method for automatic root cause analysis and generation of key metrics in a multidimensional database, in accordance with an embodiment.

At step 510, the method can provide, a computer that includes one or more microprocessors along with a multidimensional database server executing on the computer, wherein the multidimensional database server supports at least one hierarchical structure of data dimensions.

At step 520, the method can receive, at the multidimensional database server, from a user, the request comprising one or more operations.

At step 530, the method can associate each of the one or more operations of the one or more requests with the user at a user profile.

At step 540, the method can store the user profile in a log at a database accessible by the multidimensional database server, wherein the user profile comprises at least one data query of the user.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for automatic root cause analysis and generation of key metrics in a multidimensional database, comprising:
    a computer that includes one or more microprocessors; and
    a multidimensional database server executing on the computer, wherein the multidimensional database server supports at least one hierarchical structure of data dimensions;
    wherein the computer that includes one or more microprocessor performs steps comprising:
        receiving, at the multidimensional database server, a plurality of requests from a user, the plurality of requests each comprising one or more operations including at least one query;
        associating each of the one or more operations of the plurality of requests with the user at a user profile; and
        storing the user profile in a log at a database accessible by the multidimensional database server;
        identifying a preferred data query of the user from the log;
        periodically running and receiving the results of the preferred data query;
        detecting a change in a value reported in response to running and receiving the results of the preferred data query of the user based upon historical data, and
        in response to said detecting said change in the value reported in response to running and receiving the results of the preferred data query, performing automatic root cause analysis and generation of key metrics regarding said change.

2. The system of claim 1, wherein the user profile comprises historical data associated with a plurality of prior requests received at the multidimensional database server from the user.

3. The system of claim 2, wherein the user profile is updated based upon the one or more operations in each of the plurality of requests.

4. The system of claim 3, wherein the one or more operations comprise at least one of a configuration setting, a database setting, and user credentials.

5. The system of claim 4,
    wherein one or more of the plurality of requests are directed to the preferred data query of the user.

6. The system of claim 1, wherein detecting said change in a value reported in response to running and receiving the results of the preferred data query of the user is based upon historical data of the at least one hierarchical structure of data dimensions.

7. The system of claim 1, wherein performing automatic root cause analysis and generation of key metrics regarding said change comprises determining a plurality of data dimensions responsible for said change.

8. The system of claim 7, wherein a set of the plurality of data dimensions responsible for the change is provided to the user, the set of the plurality of data dimensions comprising a set of data dimensions most responsible for said change.

9. A method for automatic root cause analysis and generation of key metrics in a multidimensional database, comprising:
    providing, on a computer that includes one or more microprocessors, a multidimensional database server executing on the computer, wherein the multidimensional database server supports at least one hierarchical structure of data dimensions;
    receiving, at the multidimensional database server, a plurality of requests from a user, each of the plurality of requests comprising one or more operations including at least one query;
    associating each of the one or more operations of the plurality of requests with the user at a user profile;
    storing the user profile in a log at a database accessible by the multidimensional database server;
    identifying a preferred data query of the user from the log;
    periodically running and receiving the results of the preferred data query;
    detecting a change in a value reported in response to running and receiving the results of the preferred data query of the user based upon historical data; and
    in response to said detecting said change in the value reported in response to running and receiving the results of the preferred data query, performing automatic root cause analysis and generation of key metrics regarding said change.

10. The method of claim 9, wherein the user profile comprises historical data associated with the plurality of requests received at the multidimensional database server from the user.

11. The method of claim 10, further comprising:
    updating the user profile based upon the one or more operations in each of the plurality of requests.

12. The method of claim 11, wherein the one or more operations comprise at least one of a configuration setting, a database setting, and user credentials.

13. The method of claim 12, wherein one or more of the plurality of requests is directed to the preferred data query of the user.

14. The method of claim 9, wherein:
    detecting said change is based upon historical data of the at least one hierarchical structure of data dimensions.

15. The method of claim 9, wherein:
    performing automatic root cause analysis and generation of key metrics regarding said change comprises determining, based upon the detection of said change, a plurality of data dimensions responsible for said change.

16. The method of claim 15, further comprising:
    providing to the user a set of the plurality of data dimensions responsible for said change, the set of the plurality of data dimensions comprising those data dimensions most responsible for said change.

17. A non-transitory computer readable storage medium having instructions thereon for automatic root cause analysis and generation of key metrics in a multidimensional database, which when read and executed cause a system to perform steps comprising:

providing, at a computer that includes one or more microprocessors, a multidimensional database server executing on the computer, wherein the multidimensional database server supports at least one hierarchical structure of data dimensions;

receiving, at the multidimensional database server, a plurality of requests from a user, each of the plurality of requests comprising one or more operations including at least one query;

associating each of the one or more operations of the plurality of requests with the user at a user profile;

storing the user profile in a log at a database accessible by the multidimensional database server;

identifying a preferred data query of the user from the log;

periodically running and receiving the results of the preferred data query;

detecting a change in a value reported in response to running and receiving the results of the preferred data query of the user based upon historical data; and in response to said detecting said change in the value reported in response to running and receiving the results of the preferred data query, performing automatic root cause analysis and generation of key metrics regarding said change.

18. The non-transitory computer readable storage medium of claim 17, wherein
performing automatic root cause analysis and generation of key metrics regarding said change comprises determining, based upon the detection of said change, a plurality of data dimensions responsible for said change.

19. The non-transitory computer readable storage medium of claim 18, further comprising:
providing to the user a set of the plurality of data dimensions responsible for said change, the set of the plurality of data dimensions comprising those data dimensions most responsible for said change.

20. The non-transitory computer readable storage medium of claim 19, wherein the one or more operations comprise at least one of a configuration setting, a database setting, and user credentials.

* * * * *

UNITED STATES PATENT AND TRADEMARK OFFICE
CERTIFICATE OF CORRECTION

| | | |
|---|---|---|
| PATENT NO. | : 11,422,881 B2 | |
| APPLICATION NO. | : 16/370295 | |
| DATED | : August 23, 2022 | |
| INVENTOR(S) | : Kumar Ramaiyer | |

It is certified that error appears in the above-identified patent and that said Letters Patent is hereby corrected as shown below:

On the Title Page

Column 2, under item (57) Abstract, Lines 7-8, delete "One or more one or more" and insert -- One or more --, therefor.

Column 2, under item (57) Abstract, Line 8, delete "must" and insert -- more --, therefor.

In the Drawings

On sheet 5 of 5, in FIG. 5, under Reference Numeral 520, Line 1, delete "a from" and insert -- from --, therefor.

In the Specification

In Column 1, Lines 57-58, delete "One or more one or more" and insert -- One or more --, therefor.

In Column 5, Line 60, delete "environment" and insert -- environment. --, therefor.

In Column 6, Line 11, delete "vie" and insert -- via --, therefor.

In Column 9, Line 61, delete "Technology:" and insert -- Technology): --, therefor.

Signed and Sealed this
Seventh Day of March, 2023

Katherine Kelly Vidal
*Director of the United States Patent and Trademark Office*